US011399062B2

(12) United States Patent
Katyal et al.

(10) Patent No.: US 11,399,062 B2
(45) Date of Patent: *Jul. 26, 2022

(54) MULTIPLE SERVER AUTOMATION FOR SECURE CLOUD RECONCILIATION

(71) Applicant: Xero Limited, Wellington (NZ)

(72) Inventors: Dinesh Katyal, Fremont, CA (US); Matthew John Vickers, Wellington (NZ)

(73) Assignee: Xero Limited, Te Aro Wellington (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,926

(22) Filed: Aug. 6, 2018

(65) Prior Publication Data
US 2019/0014177 A1 Jan. 10, 2019

Related U.S. Application Data

(63) Continuation of application No. 15/446,947, filed on Mar. 1, 2017, now Pat. No. 10,069,917, which is a
(Continued)

(51) Int. Cl.
H04L 67/1097 (2022.01)
H04L 67/10 (2022.01)
(Continued)

(52) U.S. Cl.
CPC .......... H04L 67/1097 (2013.01); H04L 67/06 (2013.01); H04L 67/10 (2013.01);
(Continued)

(58) Field of Classification Search
CPC ........ G06Q 20/12; G06Q 20/40; G06Q 20/10; G06Q 20/16; G06Q 20/102; G06Q 40/02;
(Continued)

(56) References Cited

U.S. PATENT DOCUMENTS 6,707,915 B1    3/2004  Jobst et al.
9,591,066 B1    3/2017  Katyal et al.
(Continued)

FOREIGN PATENT DOCUMENTS

AU    2016379813 B2    8/2018
CN    103023640 A      4/2013
(Continued)

OTHER PUBLICATIONS

"Chinese Application No. 201680083757.9, Notification of First Office Action dated Feb. 3, 2019", (dated Feb. 3, 2019), 5 pgs.
(Continued)

Primary Examiner — Djenane M Bayard
(74) Attorney, Agent, or Firm — Schwegman Lundberg & Woessner, P.A.

(57) ABSTRACT

In various example embodiments, a system and method for automated data reconciliation processing is presented. The system receives a data movement request with a first status indicator and appends a unique request code to the data movement request. The system causes presentation of the data movement request at a client device and receives a movement response from a second server via a network. The system modifies the first status indicator of the data movement request to a second status indicator to provisionally reflect the receipt of the movement response and verifies the indication of movement from a receiving entity.

26 Claims, 10 Drawing Sheets

Related U.S. Application Data continuation of application No. 15/011,055, filed on Jan. 29, 2016, now Pat. No. 9,591,066.

(51) Int. Cl.
*H04L 67/1095* (2022.01)
*H04L 67/06* (2022.01)
*H04L 67/53* (2022.01)
*H04L 67/60* (2022.01)

(52) U.S. Cl.
CPC .......... *H04L 67/1095* (2013.01); *H04L 67/20* (2013.01); *H04L 67/32* (2013.01)

(58) Field of Classification Search
CPC .... G06Q 30/0601; G06Q 30/06; G06Q 20/20; G06Q 20/405; G06Q 30/0207; G06Q 20/3674; G06Q 20/3676; G06Q 20/387; G06Q 30/021; G06F 21/32; G06F 16/283; G06F 16/9535; G06F 21/554; G06F 21/57; G06F 21/83; G06F 21/86; G06F 2211/008; G06F 2221/2117; G06F 21/44; G06F 9/4881; G06F 9/526; G06F 3/0481; G06F 3/0482; H04L 2463/102; H04L 63/04; H04L 63/0861; H04L 67/10; H04L 41/145; H04L 41/147; H04L 41/22; H04L 43/16; H04L 67/1097; H04L 67/06; H04L 67/20; H04L 67/32; H04L 67/1095; H04L 67/146

See application file for complete search history.

(56) References Cited

U.S. PATENT DOCUMENTS

| | | | |
|---|---|---|---|
| 10,069,917 | B2 | 9/2018 | Katyal |
| 2005/0131813 | A1* | 6/2005 | Gallagher .......... G06Q 20/0855 705/39 |
| 2006/0251073 | A1 | 11/2006 | Lepel et al. |
| 2007/0143398 | A1 | 6/2007 | Graham |
| 2007/0198432 | A1* | 8/2007 | Pitroda .................. G06Q 20/02 705/64 |
| 2008/0021821 | A1 | 1/2008 | Katyal et al. |
| 2008/0103923 | A1 | 5/2008 | Rieck et al. |
| 2009/0187980 | A1* | 7/2009 | Tung .................... H04L 63/0823 726/6 |
| 2009/0319421 | A1 | 12/2009 | Mathis et al. |
| 2011/0018491 | A1 | 7/2011 | Love et al. |
| 2011/0238483 | A1* | 9/2011 | Yoo ........................ G06Q 30/02 705/14.38 |
| 2012/0054105 | A1 | 3/2012 | Seo et al. |
| 2012/0116963 | A1* | 5/2012 | Klein ................... G06Q 20/102 705/40 |
| 2013/0006811 | A1 | 1/2013 | Mascavage, III et al. |
| 2013/0060679 | A1 | 3/2013 | Oskolkov et al. |
| 2013/0021201 | A1 | 8/2013 | Mullen et al. |
| 2014/0114825 | A1 | 4/2014 | Krikorian et al. |
| 2014/0114852 | A1* | 4/2014 | Rajagopal ............. G06Q 30/06 705/44 |
| 2014/0188728 | A1* | 7/2014 | Dheer ................... G06Q 20/10 705/44 |
| 2015/0134699 | A1 | 5/2015 | Bhide et al. |
| 2016/0086151 | A1* | 3/2016 | Xia ...................... G06Q 20/385 705/71 |
| 2016/0132884 | A1 | 5/2016 | Fridman et al. |
| 2016/0217258 | A1 | 7/2016 | Pitroda et al. |
| 2017/0193487 | A1* | 7/2017 | Summers ............... G06Q 40/12 |
| 2017/0223106 | A1 | 8/2017 | Katyal et al. |

FOREIGN PATENT DOCUMENTS

| | | |
|---|---|---|
| CN | 104364792 A | 2/2015 |
| CN | 104683222 A | 6/2015 |
| CN | 108781222 A | 11/2018 |
| JP | 2003044910 A | 2/2003 |
| JP | 2006293500 A | 10/2006 |
| JP | 2012517060 A | 7/2012 |
| JP | 2017091302 A | 5/2017 |
| JP | 2018514874 A | 6/2018 |
| WO | WO-2017131797 A1 | 8/2017 |

OTHER PUBLICATIONS

"Japanese Application Serial No. 2018-550797, Notification of Reasons for Rejection dated Dec. 10, 2018", W/English Translation, 6 pgs.

"U.S. Appl. No. 15/011,055, Non Final Office Action dated Jun. 17, 2016", 16 pgs.

"U.S. Appl. No. 15/011,055, Notice of Allowance dated Oct. 25, 2016", 8 pgs.

"U.S. Appl. No. 15/011,055, Response filed Sep. 19, 2016 to Non Final Office Action dated Jun. 17, 2016", 22 pgs.

"U.S. Appl. No. 15/446,947, Advisory Action dated Feb. 23, 2018", 3 pgs.

"U.S. Appl. No. 15/446,947, Examiner Interview Summary dated Mar. 28, 2018", 3 pgs.

"U.S. Appl. No. 15/446,947, Final Office Action dated Nov. 30, 2017", 15 pgs.

"U.S. Appl. No. 15/446,947, Non Final Office Action dated May 19, 2017", 18 pgs.

"U.S. Appl. No. 15/446,947, Notice of Allowance dated Jul. 12, 2018", 8 pgs.

"U.S. Appl. No. 15/446,947, Response filed Jan. 17, 2018 to Final Office Action dated Nov. 30, 2017", 16 pgs.

"U.S. Appl. No. 15/446,947, Response filed Aug. 17, 2017 to Non Final Office Action dated May 19, 2017", 22 pgs.

"U.S. Appl. No. 15/446,947 Appeal Brief filed May 3, 2018.pdf", 26 pgs.

"Australian Application Serial No. 2016379813, First Examination Report dated Mar. 20, 2018", 3 pgs.

"Australian Application Serial No. 2016379813, Response filed Jul. 13, 2018 to First Examination Report dated Mar. 20, 2018", 104 pgs.

"International Application Serial No. PCT/US2016/020853, International Preliminary Report on Patentability dated Aug. 9, 2018", 11 pgs.

"International Application Serial No. PCT/US2016/020853, International Search Report dated May 16, 2016", 2 pgs.

"International Application Serial No. PCT/US2016/020853, Written Opinion dated May 16, 2016", 9 pgs.

"Singaporean Application Serial No. 11201806316Q, Voluntary Amendment filed Aug. 8, 2018", W/ English Claims, 15 pgs.

* cited by examiner

MULTIPLE SERVER AUTOMATION FOR SECURE CLOUD RECONCILIATION

CLAIM OF PRIORITY

This application is a Continuation application under 35 USC § 120 of U.S. patent application Ser. No. 15/446,947, entitled "Multiple Server Automation for Secure Cloud Reconciliation," filed on Mar. 1, 2017, which is a Continuation application under 35 USC § 120 of U.S. patent application Ser. No. 15/011,055, entitled "Multiple Server Automation for Secure Cloud Reconciliation," filed on Jan. 29, 2016, and are herein incorporated by reference in their entirety.

TECHNICAL FIELD

The present disclosure generally relates to automating multiple servers to perform secure cloud reconciliation. More specifically, to systems and methods for automated reconciliation of requests via data from various servers.

BACKGROUND

A sending entity receives a request for data from a receiving entity via email, on paper, or through an online service (via online servers). Such data requests between entities are often performed by third parties and, technically, are often performed using an electronic system.

This process, once considered to be efficient and innovative, is now often a manual way to handle such transfers, particularly in the context of a cloud data management system that must work with millions of data transfers from countless entities simultaneously. To make a transfer, the sending entity connects to a server, manually enters the transfer details, and submits the transfer request. The relevant transfer is made to the receiving entity's server from the sending entity's server.

To make a similar data transfer via a third party, the sending entity connects to a server associated with the third party, enters the transfer details, and submits the transfer request. The relevant data is transferred from the sending entity's server to the third party server. The third party server then transfers said information to the receiving entity's server.

BRIEF DESCRIPTION OF THE DRAWINGS

Some embodiments are illustrated by way of example and not of limitation in the figures of the accompanying drawings.

DETAILED DESCRIPTION

Figure 1:
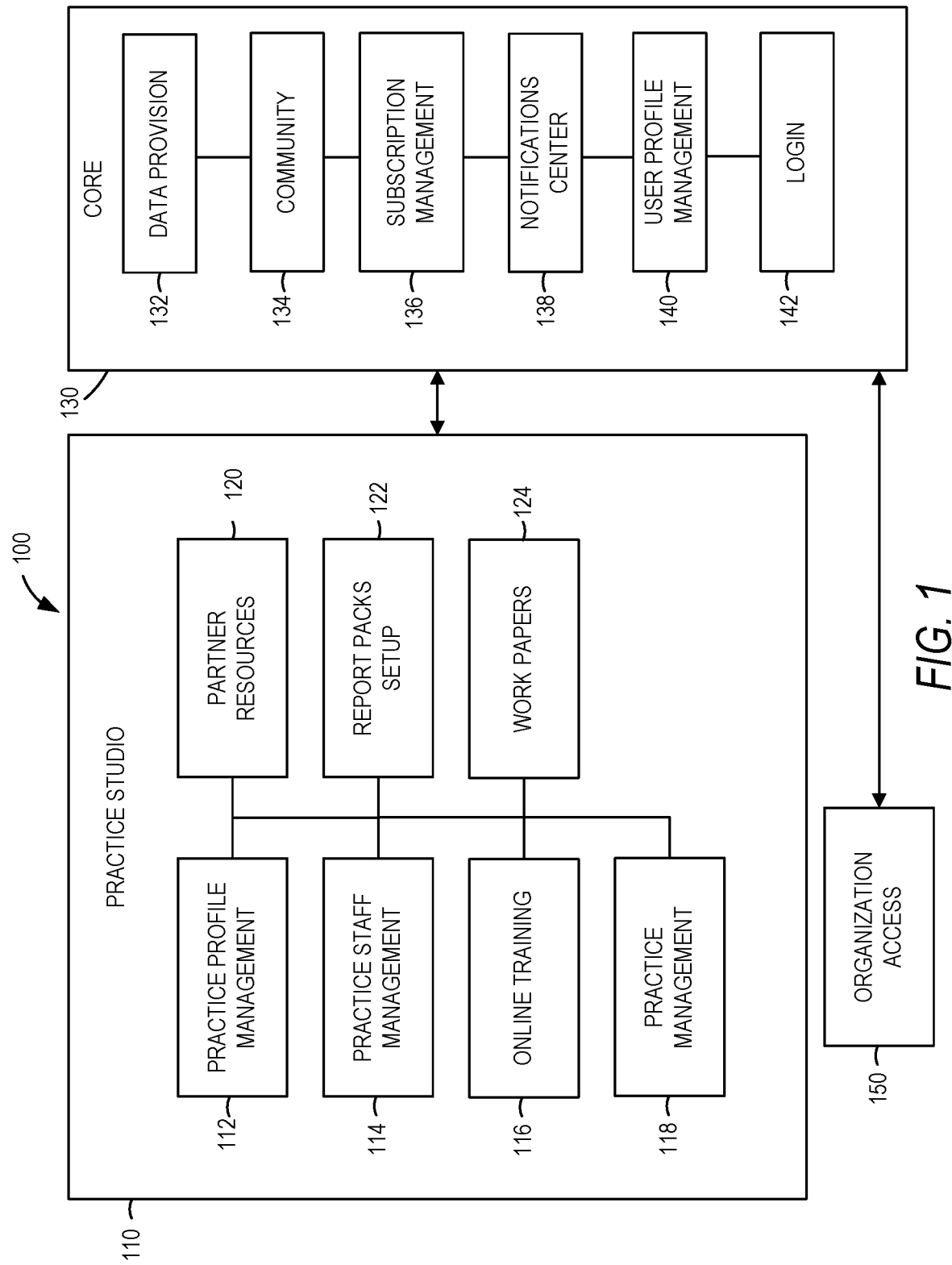
FIG. 1 is a block diagram depicting an example single ledger accounting platform, according to some embodiments.

Example systems and methods to facilitate data movement and reconciliation are described. In the following description, for purposes of explanation, numerous specific details are set forth in order to provide a thorough understanding of example embodiments. It will be evident, however, to one skilled in the art that the present technology may be practiced without these specific details.

The technology described herein provides data and message transmission between a one or more servers across differing domains to coordinate multiple parties into automated reconciliation of requests, data provisioning, and responses as part of a single transaction. The data request, provisioning, and reconciliation of responses may form all or part of a reconciliation system. In some embodiments, as described below, the reconciliation system may be used in conjunction with additional software or systems to provide one or more of the methodologies described herein for requesting, provisioning, and reconciling data transfers across distinct domains In some example embodiments, the technology described herein provides online (i.e., cloud based) software services to businesses with features such as a data transfer and reconciliation mechanism available to a business's customers. The data transfer and reconciliation mechanism may drive data elements through a designated server rather than second server of the second domain (e.g., credit card transaction processors, PayPal, and so on), and perform subsequent automatic recording of that data element matched to the original data movement request within the reconciliation system. A data movement request may be understood as a statement of data elements for which a specified user or server is to perform a predetermined actions with respect to the data element.

For example, the methods and systems described herein may enable transfer and reconciliation of payments between users where the payments are associated with data movement requests (i.e., payment or compensation requests and invoices). The payment initiator may generate an invoice and transmit the invoice to a second server of the second domain for transacting payment between the payment initiator (e.g., payee) and the payer. The payer may be presented with the complete or partial invoice during a network-based communication session (e.g., online banking session), either with the payer's bank or the second server of the second domain. The payer may initiate a payment transaction, handled between the second server of the second domain, the first entity, and the payee's bank. One or more of the first entity, the second server of the second domain, and the second entity provide notifications and invoice payment updates to the data management system which determines reconciliation of the payment and notification to the payee and payer.

The information may be sent from the payment initiator to the institution via the customer (e.g., the payer). For example, the encrypted data may be sent from a web site of the payment initiator to a web browser of the customer running on a customer device. After the payment has been initiated by the institution, a confirmation may be sent to the customer, the payment initiator, the business, or any suitable combination thereof.

FIG. 1 is a block diagram depicting an example single ledger data management system 100. In some embodiments, the data management system 100 may be a single ledger accounting system 100 providing accounting tools to a particular entity managing accounting for one or more businesses. The example single ledger accounting system 100 may include a practice studio 110 that allows an entity to manage one or more businesses and an organization access module 150 that provides a business with tools for managing accounting data for that particular business. The practice studio 110 may include a practice staff management module 114, an online training module 116, a practice management module 118, a partner resources module 120, a report packs setup module 122, and a work papers module 124. The practice studio 110 may be in communication with core features 130. The core features 130 may include an data provision module 132, a community module 134, a subscription management module 136, a notifications center module 138, a user profile management module 140, and a login module 142. The organization access module 150 may be in communication with the core features 130. The practice studio 110 and core features may be accessed by an entity using a login module 142.

As shown in FIG. 1, features of the accounting system 100 are divided into three areas based on the target user. The features of the practice studio 110 provide a suite of tools for accountants to interact with their clients and manage their practices. The core features 130 provide the core functionality and user tools common to both accountants and businesses. The organization access module 150 provides a user interface for individual businesses to access their data.

Practice studio 110 is the central login for accountants. For example, an accountant with multiple clients, each of which is a small business, can login using practice studio 110 and gain access to the accounting data for the clients, messages from the clients, and so on.

The practice staff management module 114 provides the ability for the manager of an accounting practice to control settings for the staff of the practice. For example, some staff members may have read-only access to data for certain clients, some staff members may have read-write access for certain clients, some staff members may be able to modify the access permissions for other staff members, and so on.

The online training module 116 provides training for accountants and their staff. In some cases, the provided training includes one or more video presentations and one or more online tests. Notification of passing a test at completion of a training may be provided. For example, a staff member may take a training course and, upon successful completion, the accountant supervising the staff member may receive a notification of the successful completion.

The practice management module 118 provides services for accountants. Access to the features provided by the practice management module 118 may be limited to accountants having a predetermined partner level with the data management platform provider. For example, access to the practice management module 118 may be limited to accountants at silver level or above. The services provided by the practice management module 118 may include workflow tools, customer relationship management (CRM) tools, lead generation tools, job management tools, data movement request generation tools, and so forth.

The partner resources module 120 provides information regarding third-party partners. For example, a third party may provide tools that interact with the system to provide useful functionality beyond that of the system alone. The user can access the partner resources module 120 to learn about available third-party tools. For example, links to third-party websites, documentation, videos, and search tools may all be provided.

The report packs setup module 122 provides tools to allow accountants to create and generate standardized sets of reports. For example, a profit and loss statement and quarterly report could both be added to a pack. The accountant would then be able to easily generate both reports for any selected client, or generate the reports for every client.

The work papers module 124 provides tools for accountants to interactively create financial reports. For example, an accountant can enter known data for a client into the work paper, and then send the work paper to the client with an indication of data needed from the client. After the client enters the missing data into the work paper, the accountant can complete the report.

The core features 130 includes modules that are used both by accountants and organizations. The data provision module 132 provides the general ledger for organizations. The general ledger may be integrated with the organization's payroll, bypassing the separate step of entering payroll data into the general ledger each pay period. The data provision module 132 accesses banking data for each client business. The banking data may be imported into either through a bank feed or a user- or accountant-created document. The data provision module 132 may also communicate with third-party tools via an application protocol interface (API).

The community module 134 provides a forum through which users can communicate. For example, a user with a question may post a topic in the forum and later receive a helpful response from another user. Information taken from the user profile (e.g., the user profile managed via the user profile management module 140) may appear along with forum posts by the user. For example, a user name, an image of the user, and the user's status as an accountant or member of an organization may each be shown.

The subscription management module 136 allows a user to configure one or more billing accounts for each organization using the system. The system may periodically charge a subscription fee for access (e.g., a monthly or annual subscription fee). The subscription fee may be automatically deducted from the one or more billing accounts. Modules performing various functions of the subscription management module 136, with respect to direct bank transactions are described with more detail below in FIG. 5.

The notifications center module 138 provides notifications to users. For example, users may send messages to each other, which appear as notifications. Notifications may also be created by the system (e.g., by data provision module 132) based on events. For example, a minimum account balance for a particular bank account may be set by a user via the data provision module 132. When the balance for that bank account drops below the minimum account balance, a notification can be generated by the system informing the user.

The user profile management module 140 allows a user to manage the profile of the user's organization and the profiles of others based on permission settings. For example, an accountant may have permission to manage the profiles of the accountant's clients. The profile may include public-facing information such as a business name and address.

The login module 142 verifies the identity of a user logging into the system (e.g., via user name and password). Based on the user's identity, a user interface is presented that includes a list of organizations that a user has access to. For most small business clients, the list will consist of a single organization.

The organization access module 150 accesses the core features 130 for a single organization. The organization access module 150 presents, after user verification by the login module 142, a user interface with options for a single organization without the additional features used only by the practice studio 110.

Figure 2:
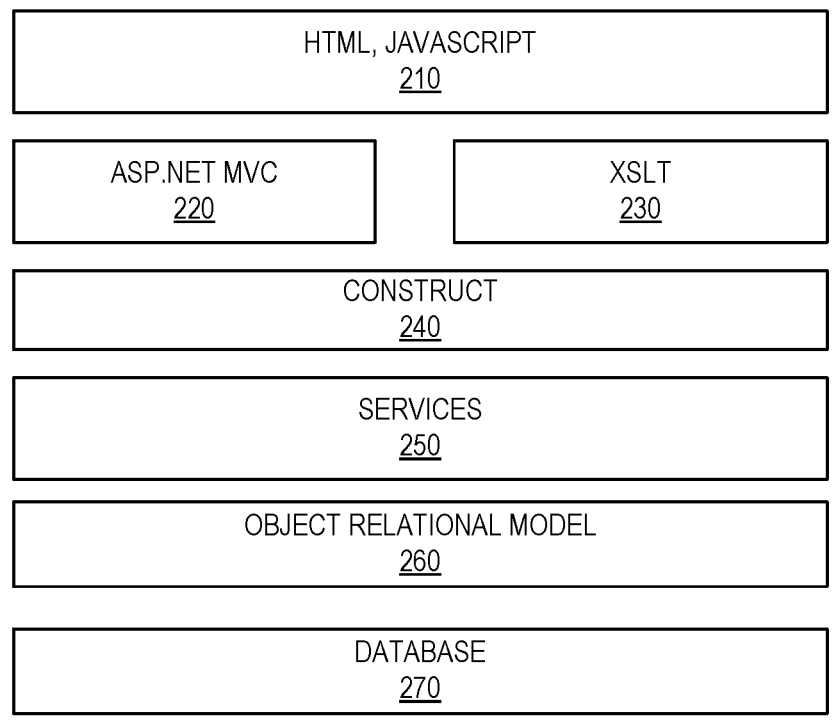
FIG. 2 is a block diagram depicting an example accounting application framework for the accounting platform, according to some embodiments.

FIG. 2 is a block diagram depicting an example data management application framework 200 for the data management platform. The data management application framework 200 may be an end-to-end web development framework enabling a "software as a service" (SaaS) product. The data management application framework 200 may include a hypertext markup language (HTML) and/or JavaScript layer 210, ASP.Net Model-View-Controller (MVC) 220, extensible stylesheet language transformations (XSLT) 230, construct 240, services 250, object relational model 260, and database 270.

The HTML and/or JavaScript layer 210 provides client-side functionality, such as UI generation, receipt of user input, and communication with a server. The client-side code may be created dynamically by the ASP.NET MVC 220 or the XSLT 230. Alternatively, the client-side code may be statically created or dynamically created using another server-side tool.

The ASP.Net MVC 220 and XSLT 230 provide server-side functionality, such as data processing, web page generation, and communication with a client. Other server-side technologies may also be used to interact with the database 270 and create an experience for the user.

The construct 240 provides a conduit through which data is processed and presented to a user. For example, the ASP.Net MVC 220 and XSLT 230 can access the construct 240 to determine the desired format of the data. Based on the construct 240, client-side code for presentation of the data is generated. The generated client-side code and data for presentation is sent to the client, which then presents the data.

The services 250 provide reusable tools that can be used by the ASP.Net 220, the XSLT 230, and the construct 240 to access data stored in the database 270. For example, aggregate data generated by calculations operating on raw data stored in the database 270 may be made accessible by the services 250.

The object relational model 260 provides data structures usable by software to manipulate data stored in the database 270. For example, the database 270 may represent a many-to-one relationship by storing multiple rows in a table, with each row having a value in common. By contrast, the software may prefer to access that data as an array, where the array is a member of an object corresponding to the common value. Accordingly, the object relational model 260 may convert the multiple rows to an array when the software accesses them and perform the reverse conversion when the data is stored.

Figure 3:
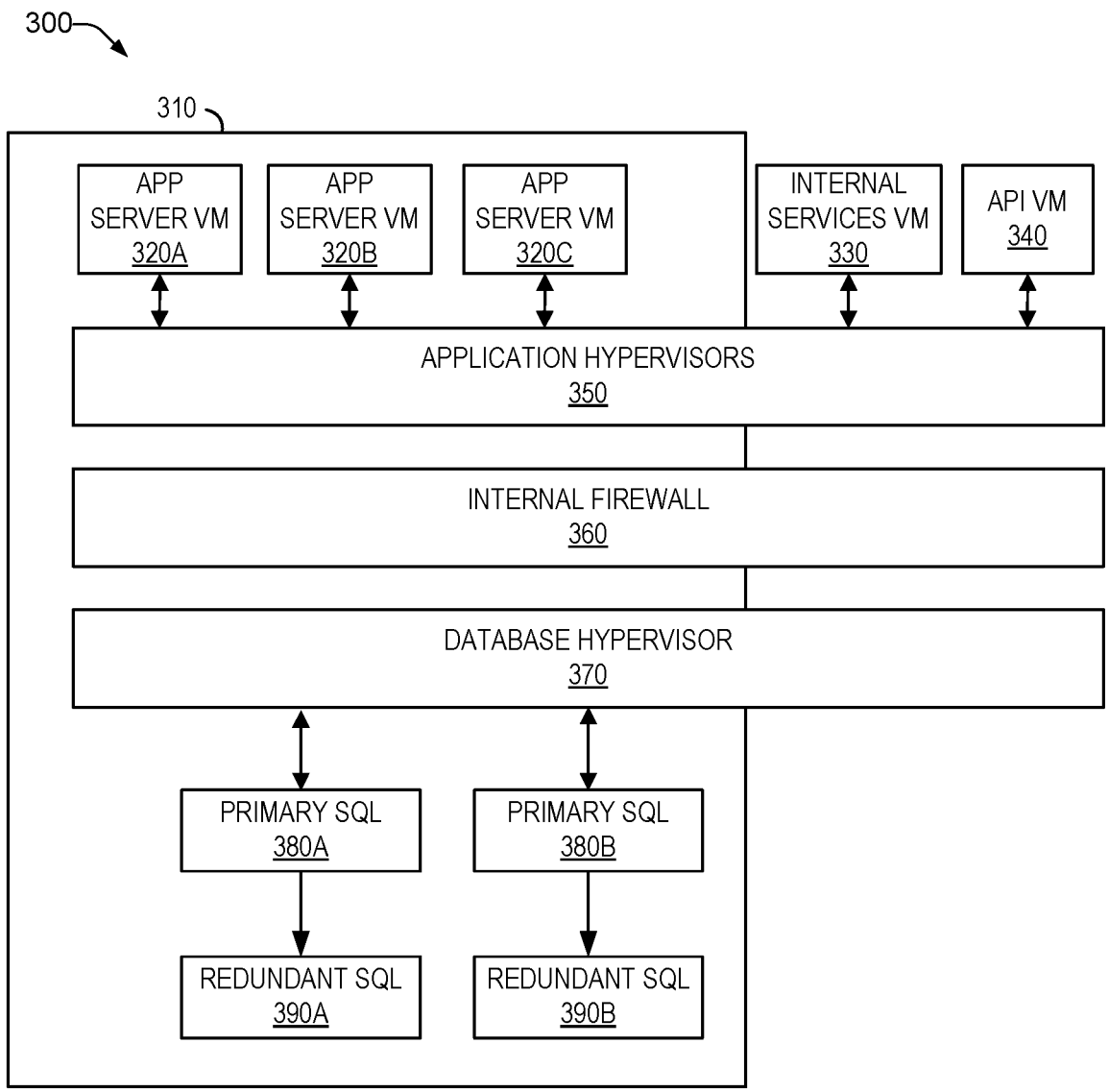
FIG. 3 is a block diagram depicting an example hosting infrastructure for the accounting platform, according to some embodiments.

FIG. 3 is a block diagram depicting an example hosting infrastructure 300 for the data management platform. The platform may be implemented using one or more pods 310. Each pod 310 includes application server virtual machines 320 (shown as application server virtual machines 320A-320C in FIG. 3) that are specific to the pod 310 as well as application server virtual machines (VMs) that are shared between pods 310 (e.g., the internal services VM 330 and the application protocol interface VM 340). The application server virtual machines 320-340 communicate with clients and third-party applications via a web interface or an API. The application server virtual machines 320-340 are monitored by application hypervisors 350. An internal firewall 360 ensures that only approved communications are allowed between a database hypervisor 370 and the publically-accessible virtual machines 320-340. The database hypervisor 370 monitors the primary SQL servers 380A and 380B. The primary SQL servers 380A and 380B access the shared storage layer 450A or 450B (shown in FIG. 4) to read and write data generated by or used by the application server virtual machines 320-340. The redundant SQL servers 390A and 390B provide backup functionality for the primary SQL servers 380A and 380B, respectively.

The virtual machines 320-340 can be implemented using Windows 2008 R2, Windows 2012, or another operating system. The application and support servers supporting the virtual machines 320-340 can be built using spares for redundancy. The support servers can be shared across multiple pods 310. The application hypervisors 350, internal firewall 360, and database hypervisor 370 may span multiple pods 310 within a data center. In some example embodiments, each primary SQL server 380 and redundant SQL server 390 is configured to support 30,000-45,000 organizations. Accordingly, in embodiments using two such server pairs per pod 310, the pod capacity is 60,000-90,000 organizations. The redundant SQL servers 390 may take advantage of the "always on" resilience feature of SQL 2012.

Figure 4:
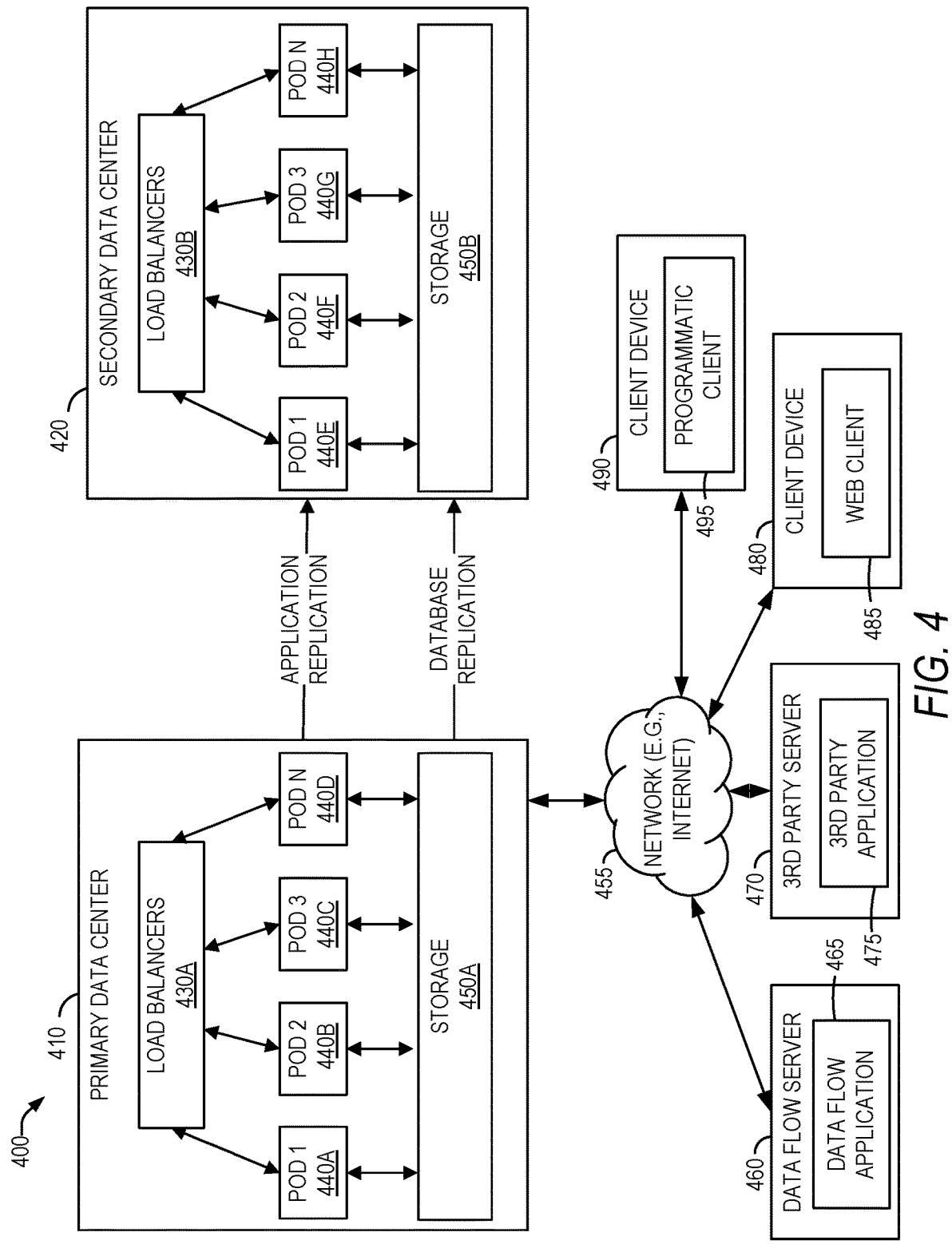
FIG. 4 is a block diagram depicting an example data center system of the accounting platform, according to some embodiments.

FIG. 4 is a block diagram depicting an example data center system 400 of the data management platform interacting with other systems over a network. The primary data center 410 services customer requests and is replicated to the secondary data center 420. The secondary data center 420 may be brought online to serve customer requests in case of a fault in the primary data center 410. The primary data center 410 communicates over a network 455 with data flow server 460, third party server 470, client device 480, and client device 490. The data flow server 460 provides banking data (e.g., via the data flow application 465). The third party server 470 is running third party application 475. Client devices 480 and 490 interact with the primary data center 410 using web client 485 and programmatic client 495, respectively.

Within each data center 410 and 420, a plurality of pods, such as the pod 310 of FIG. 3, are shown. The primary data center 410 is shown containing pods 440A-440D. The secondary data center 420 is shown containing pods 440E-440H. The applications running on the pods of the primary data center are replicated to the pods of the secondary data center. For example, EMC replication (provided by EMC Corporation) in combination with VMWare site recovery manager (SRM) may be used for the application layer replication. The database layer handles replication between the storage layer 450A of the primary data center and the storage layer 450B of the secondary data center. Database replication provides database consistency and the ability to ensure that all databases are at the same point in time.

The data centers 410 and 420 use load balancers 430A and 430B, respectively, to balance the load on the pods within each data center. The data centers 410 and 420 can be created using identical hardware to ensure that the performance of the secondary data center 420 is the same as the performance of the primary data center 410. The storage layer 450A and 450B may be implemented using one or more storage area networks such as the VNX storage area networks from EMC.

The data flow server 460 interacts with the primary data center 410 to provide bank records for bank accounts of the client. For example, the client may provide account credentials to the primary data center 410, which the primary data center 410 uses to gain access to the account information of the client. The data flow server 460 can provide the banking records to the primary data center 410 for later reconciliation by the client using the client device 480 or 490.

The third party server 470 may interact with the primary data center 410 and the client device 480 or 490 to provide additional features to a user of the client device 480 or 490. For example, a user may authorize the third party server 470 to access the user's data stored in the primary data center 410. The third party application 475 of the third party server 470 may use the user's data to generate reports, provide macros, or otherwise improve the user's ability to access or manipulate the user's data. The third party application 475 may communicate with the primary data center 410 via the network 455 using an API. The third party application 475 may communicate with the client device 480 or 490 using a web or programmatic interface.

Figure 5:
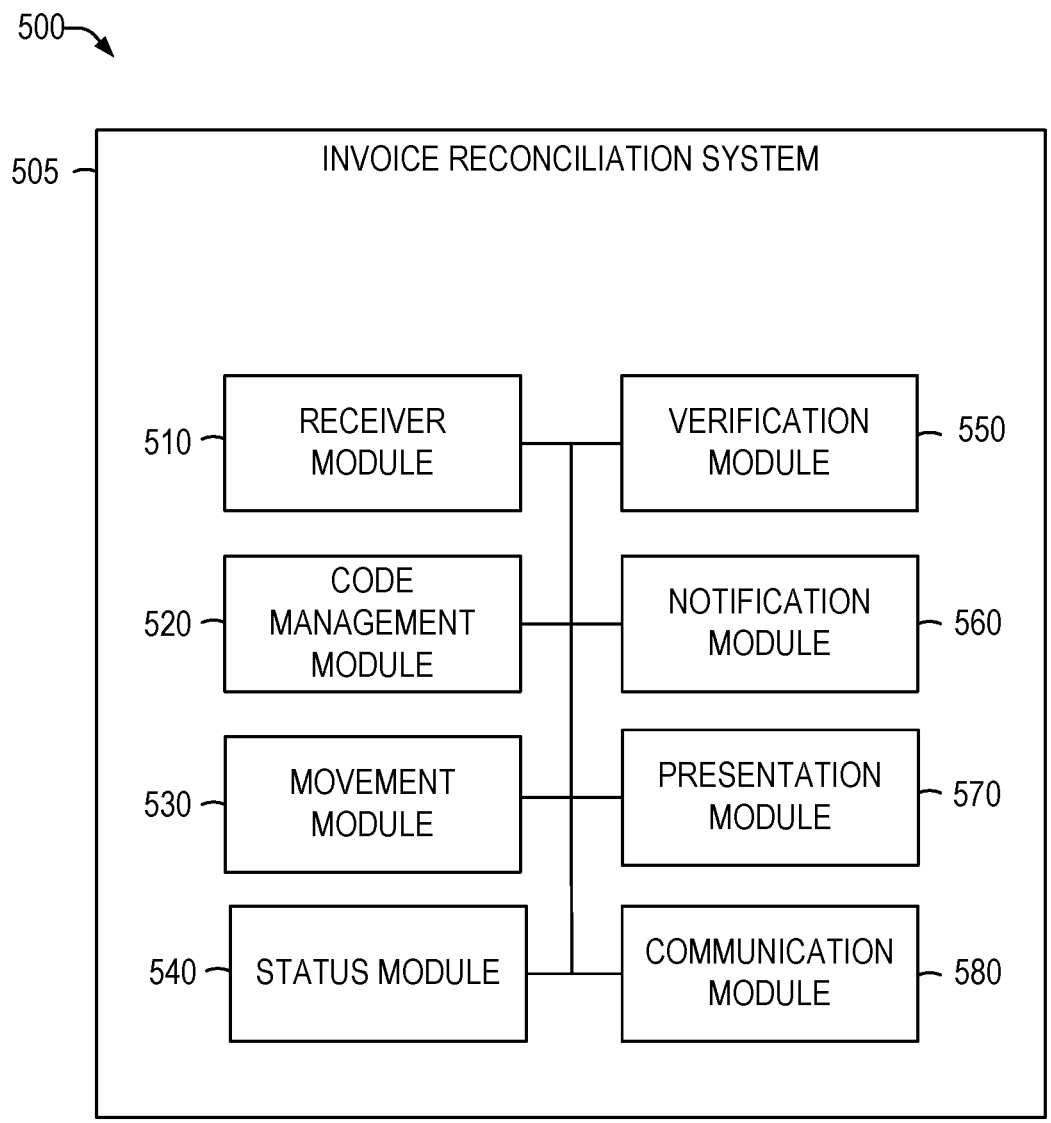
FIG. 5 is a block diagram depicting an example request reconciliation system of the data management system, according to some example embodiments.

FIG. 5 is a block diagram 500 illustrating components of an data reconciliation system 505 suitable for presentment of data movement requests, data provisioning, and reconciliation of the data movement request with transaction records (e.g., statements) of an associated server (i.e., an institution). As shown in FIG. 5, the data reconciliation system 505 is a part of the data provision module 132, according to some example embodiments. The data reconciliation system 505 is shown as including a receiver module 510, a code management module 520, a movement module 530, a status module 540, a verification module 550, a notification module 560, a presentation module 570, and a communication module 580 all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The receiver module 510 receives data indicative of invoices, transaction records (e.g., responses to batch data movement requests), and other data transmitted to the data reconciliation system 505. The receiver module 510 passes requests or instructions relating to the data movement requests (e.g., invoices) and data transaction records to other modules of the data reconciliation system 505. The receiver module 510 may pass the requests, responses, and instructions to the other modules using the communication module 580. The receiver module 510 is a hardware-implemented module or a module implemented by a combination of hardware and software (e.g., hardware configured by software to perform various functions). An example embodiment of components included in or accessed by the receiver module 510 is described with respect to FIG. 10. Functions of the receiver module 510 are discussed in further detail below.

The code management module 520 receives data indicative of data movement requests from the receiver module 510 and appends request codes to the data movement requests. In some example embodiments, the code management module 520 generates unique request codes (e.g., unique invoice codes identifying an invoice) prior to appending the request codes to the data movement requests. The code management module 520 may pass the data movement request with appended request code to one or more of the status module 540, the verification module 550, and the presentation module 570 using the communication module 580. In some example embodiments, the code management module 520 may store the data movement request and appended request code in a data structure (e.g., data table) within the database 270 for access and modification by one or more of the modules of the data reconciliation system 505. The code management module 520 can be a hardware implemented module or a combination of hardware and software implemented module. An example embodiment of components included in or accessed by the code management module 520 is described with respect to FIG. 10.

The movement module 530 requests and receives movement responses (e.g., indications of payment) during network based communications sessions (e.g., a network-based banking session). For example, in some embodiments where the reconciliation system 505 is reconciling payments, the movement module 530 requests and receives indications of payment during the network-based communications session. The movement module 530 may store the movement responses in the database 270 for access by other modules. In various embodiments, the stored movement responses are associated within the database 270 with user profile information and a data movement request for which the movement request is a response. The movement module 530 is a hardware implemented module or a combination of hardware and software implemented module. An example embodiment of components included in or accessed by the movement module 530 is described with respect to FIG. 10.

The status module 540 identifies and modifies status indicators within invoices to reflect changes in status of movement for the data movement request. The status module 540 accesses and modifies the status indicators of the data movement request stored in the database 270. The status module 540 may be a hardware implemented module or a combination of hardware and software implemented module. An example embodiment of components included in or accessed by the status module 540 is described with respect to FIG. 10.

The verification module 550 verifies movement responses from recipients and reconciles data movement requests with data movements passing among servers across domains (e.g., institutions). In various example embodiments, the verification module 550 uses the communication module 580 to transmit batch data movement requests and receive movement notifications including statements of data movement (e.g., transaction records within a date range) from servers across one or more domains (e.g., institutions) associated with users of the data management system 100 in order to verify transaction data relating to movement responses using the data reconciliation system 505 and reconcile data movement requests with the transaction data. The verification module 550 can be a hardware implemented module or a combination of hardware and software implemented module. An example embodiment of components included in or accessed by the verification module 550 is described with respect to FIG. 10.

The notification module 560 generates notifications of payment for the data reconciliation system 505. In various example embodiments, the notification module 560 generates presentation notifications verifying presentation of the data movement request and request code at a client device (e.g., the client device 480 or 490), and various other functions described herein. The notification module 560 can be a hardware implemented module or a combination of hardware and software implemented module. An example embodiment of components included in or accessed by the notification module 560 is described with respect to FIG. 10.

The presentation module 570 causes presentation of data movement requests and transaction detail information (e.g., statement responses, account information, payment information, and reconciliation information) at client devices (e.g., the client device 480 or 490). The presentation module 570 can generate a set of user interface elements, screens, frames, or the like for presentation at client devices. The presentation module 570 causes presentation of data movement requests and transaction detail information by transmitting data representative of the data movement requests and the transaction detail information to the client device, via the communication module 580. The presentation module 570 can be a hardware implemented module or a combination of hardware and software implemented module. An example embodiment of components included in or accessed by the presentation module 570 is described with respect to FIG. 10.

The communication module 580 may facilitate communication among the receiver module 510, the code management module 520, the movement module 530, the status module 540, the verification module 550, the notification module 560, the presentation module 570, the client device 480 or 490, third party server 470, and the data flow server 460. In some embodiments, the communication module 580 facilitates or enables communication with a plurality of bank servers, with the data flow server 460 among the plurality of bank servers. The communication module 580 may enable communication among the modules and components described herein via a bus, shared memory, a switch, or any other suitable communication mechanism or method. As such, the communication module 580 may be a configured port, server, or other hardware device configured by software or machine-executable instructions to perform one or more of the communications related methodologies described herein.

Figure 6:
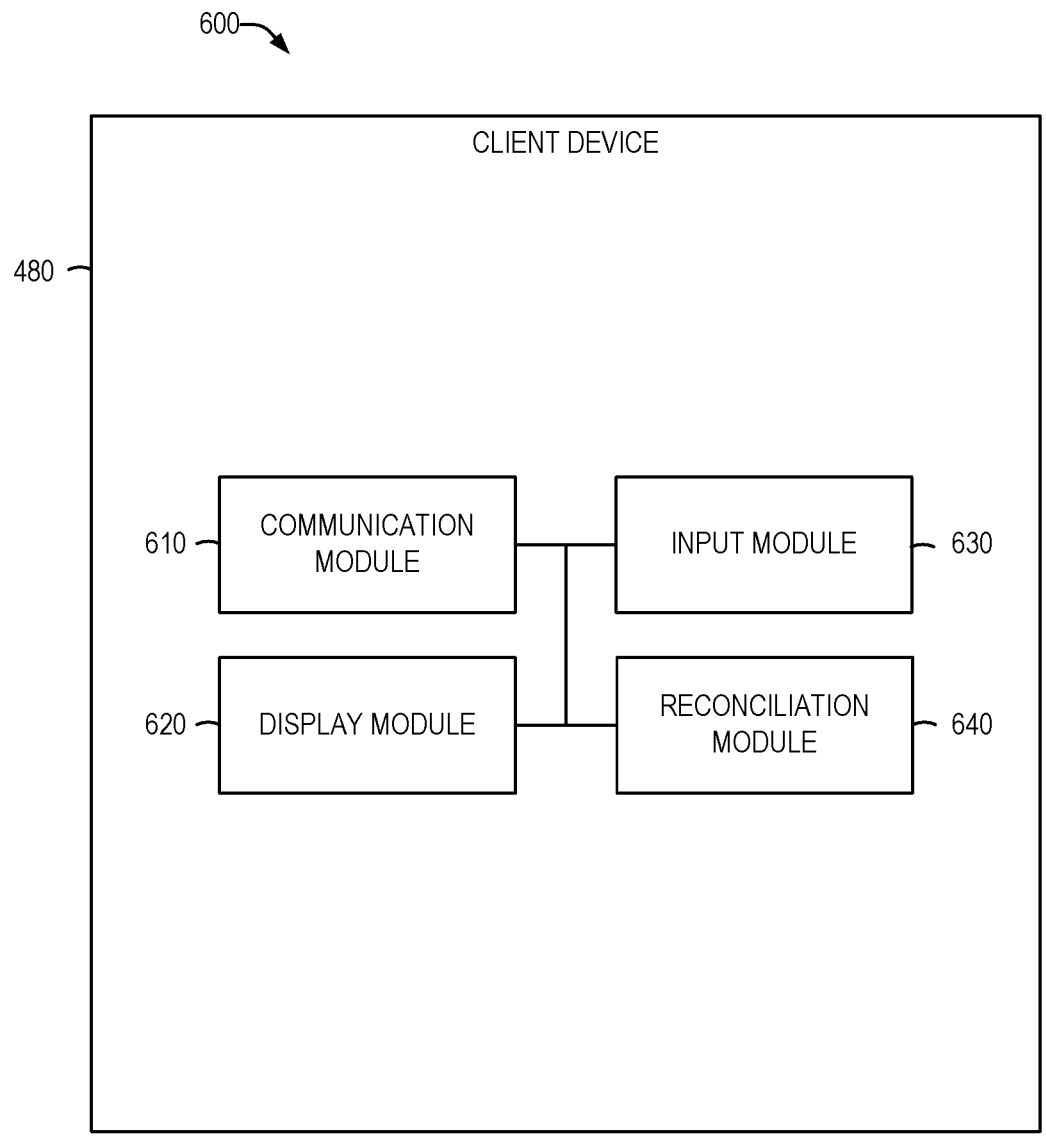
FIG. 6 is a block diagram depicting an example client device for accessing the data management system, according to some embodiments.

FIG. 6 is a block diagram illustrating components of a block diagram 600 (e.g., representing a client device) suitable for mobile banking reconciliation, according to some example embodiments. The client device 480 (or 490) is shown as including a communication module 610, a display module 620, an input module 630, and a reconciliation module 640, configured to communicate with each other (e.g., via a bus, shared memory, or a switch).

The communication module 610 may communicate with the primary data center 410, the third party server 470, the network 455, or any suitable combination thereof. Information received via the communication module 610 may be presented (e.g., displayed on a display device) via the display module 620. Information may be selected or search queries may be entered by a user of the client device 480 (or 490).

A user interface is presented by the display module 620. The input from the user is detected by the input module 630. Commands received from the user by the input module 630 may be communicated to the primary data center 410 by the communication module 610. The communication module 610 may receive a response from the primary data center 410 that includes a set of banking records, a set of business records, associations between individual banking records and individual business records that indicate reconciliation between those records, and other data, in any combination.

The reconciliation module 640 can generate requests to the primary data center 410 to indicate that a banking record is reconciled by one or more business records. The request can be communicated to the primary data center 410 via the communication module 610, over the network 455.

Figure 7:
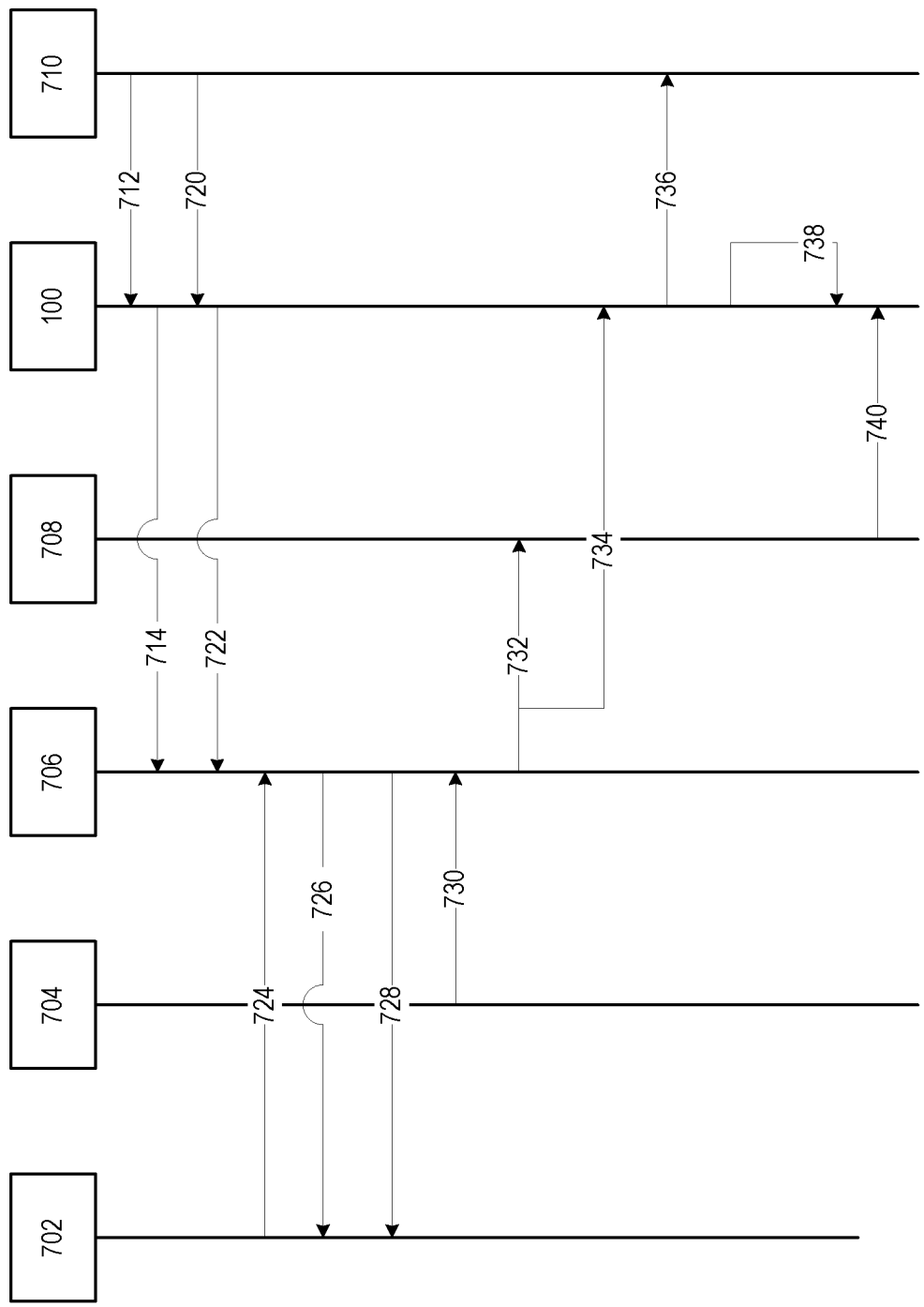
FIG. 7 is a block diagram depicting the flow of data between entities facilitating data movement and reconciliation, according to some embodiments.

FIG. 7 is a block diagram depicting the flow of data between entities facilitating a transfer of funds, in an example embodiment. The entities interacting within FIG. 7 are a first device 702 (e.g., a client device 480 or 490 associated with a first user), a first entity 704, a second server of the second domain 706, second entity 708, the data management system 100, and a second device 710 (e.g., a client device 480 or 490 associated with a second user). In some instances, the first device 702 is associated with a user of the data management system 100. In context of FIG. 7, and the methodologies described herein, the first user, employing the first device 702 or any other suitable device, is the paying party of the transaction billed by the second user, generating a bill and transaction using the second device 710 or any other suitable device.

The first entity 704 is a institution associated with the first user or the first device 702. As described herein, the first entity 704 is a bank capable of performing network-based (e.g., online) transactions for and against an account of the first user. However, it should be understood that the first entity 704 may be any suitable institution such as a bank, a credit union, a second server of the second domain drawing on an associated payment account of the first user, or any other institution. In some embodiments the payment account of the first user is associated with the first device 702 accessed through the first device 702.

The second server of the second domain 706 is a network-based service capable of performing all or part of a payment transaction between two institutions (e.g., the second entity 708 and the first entity 704). In various embodiments, the second server of the second domain 706 is a third party second server of the second domain (e.g., PayPal, CheckFree, an ACH system, etc.). However, it should be understood that, in some embodiments, the second server of the second domain 706 is affiliated with or a part of the first entity 704. In these embodiments, transactions, such as billing statements, transmitted to the second server of the second domain 706 are effectively transmitted to the first entity 704.

The second entity 708 is a institution associated with the second user, and may be associated with the second user through a second user account. The second user may use the second device 710. In various embodiments, the second entity 708 is a bank capable of performing network-based (e.g., online) transactions for and against an account of the second user, a credit union, a second server of the second domain drawing on an associated payment account (e.g., second user account) of the second user, or any other suitable institution. The second user is a user of the data management system 100 and may access the data management system 100 using the second device 710.

As shown in FIG. 7, the second user may interact with the data management system 100, using the second device 710, to enroll in one or more service of the data management system 100, electronically present bills (e.g., ebill) directly to a network enabled (e.g., online) bank account of the first user associated with the first device 702. In various embodiments, the data management system 100 enrolls second user by a registration function 712 exchanging information between the data management system 100 and the second device 710. The registration function 712 may create an account or otherwise associate the second user or the second device 710 with the data management system 100 to generate identifiable information for the second user or the second device 710 within the data management system 100. For example, the registration function 712 may prompt the second user to enter, using the second device 710, an account name, a password, demographic information, financial information, contact information, and information relating to goods and services for which the second device 710 may generate data movement requests or other records automatically or by interaction between the second user and the second device 710.

In various embodiments, in function 714, the data management system 100 registers second user or the second device 710 with one or more of the first entity 704 and the second server of the second domain 706. Although function 714 is shown in FIG. 7 as extending between the data management system 100 and the second server of the second domain 706, it should be understood that the function 714 may similarly register the second user or second device 710 with the first entity 704. In some instances, the function 714 registers the second user or second device 710 with a plurality of institutions. For example, the data management system 100, via the function 714, may register the second user or second device 710 with a plurality of institutions with which the data management system 100 is associated or who recognize the data management system 100. In some instances, the data management system 100 registers the second user or second device 710 automatically, without user interaction from the second user via the second device 710 after the second user enrolls with the data management system 100 via the function 712 using the second device 710. In some embodiments, completion of the function 712 causes the data management system to automatically perform the function 714 to register the second user or second device 710 with the plurality of institutions.

After the second device 710 has interacted with the data management system 100 via the function 712 to enroll the second user and the data management system 100 has registered the second user or the second device 710 by the function 714, the second device 710 may generate electronic bills and transmit the electronic bills by the data management system 100 to one or more of the plurality of institutions (e.g., the first entity 704 and the second server of the second domain 706). Generation of an electronic bill is performed through bill creation function 720. The bill creation function 720 may include generation and presentment of a user interface (e.g., a set of user interface screens) at the second device 710 to generate and transmit the ebill to the first device 702 (e.g., a client device associated with the first user). For example, the second device 710 may present a set of selectable user interface elements within a graphical user interface prompting or accepting input of various transaction data, such as item or service information, purchase terms, purchase price, payer information, and other data which may form part of a transaction between a merchant and a customer. In various embodiments, the data management system 100 may automatically generate the ebill based on transactions passed to the data management system 100 from the second device 710. For example, where the second user has an electronic commerce website through which the first user makes a purchase using the first device 702, the website may pass transaction data to one or more of the second device 710 and the data management system 100. Receiving the transaction data may trigger the data management system 100 to generate the ebill without further input or interaction by the second user.

The data management system 100 submits the ebill (e.g., an data movement request or invoice) generated via function 720 to the second server of the second domain 706 via function 722. In some instances, the data management system 100 submits the ebill to the first entity 704, directly or through the second server of the second domain 706. The submission of the ebill via function 722, as well as billing and payment functions logged or conducted through the data management system 100 are accounting transactions tracked by the data management system 100. In function 720 or prior to the function 720, the data management system 100 generates a unique identifier and includes the unique identifier within the data movement request as a part of either a full or partial data movement request presentment at the first device 702. In some embodiments, the data movement request is presented as a single data movement request, while in some embodiments, a single data movement request may be divided and presented as multiple data movement requests (e.g., an invoice paid on an installment plan). In embodiments where the data movement request is presented as multiple data movement requests, the multiple data movement requests may each receive a unique identifier or may each contain the same unique identifier.

The first device 702 may request ebills (e.g., data movement requests or invoices) from the first entity 704 via a bill request function 724. In some embodiments, the bill request function 724 is performed in response to interactions between the first user operating the first device 702. The bill request function 724 may also be automated, such that the first device 702 performs the bill request function 724 based on a scheduled time or one or more monitored conditions. Monitored conditions may include an email having an data movement request, operation of an application on the first device 702 in which a payment function of the application was used, accessing of a purchasing application on the first device 702, accessing of a commerce website in a browser of the first device 702, or any other monitored condition. In embodiments where the first device 702 requests ebills using the bill request function 724, the first user may be required to register (e.g., register the first user or register the first device 702) via function 726 to receive ebills from the second user generated by one or more of the second device 710 and the data management system 100. The registration function 726 may be performed similarly to the registration or enrollment processes discussed above. In some instances, the registration function 726 includes enrolling in an online banking service.

As shown in FIG. 7, the second server of the second domain 706 presents the ebill in a presentation function 728, after registration. In various embodiments, the bill request function 724 is a function involving the data management system 100 and the second server of the second domain 706, where the data management system 100 has a preexisting relationship with the first entity 704 and the second server of the second domain 706 as established via functions 712 and 714 described above. In some instances, as shown in FIG. 7, the bill request function 724 is a function of the first entity 704 performed during an online communication session between the first entity 704 and the first device 702.

The first device 702 interacts with the first entity 704 to cause the first entity 704 to perform a payment function 730. As will be explained in more detail below, the payment function 730 remits payment to the second entity 708 through the second server of the second domain 706. A portion of the payment function 730 may be part of or trigger the data management system 100 to reconcile accounts for the first user and the second user with respect to the payment and transmit notification of the reconciled accounts to one or more of the first device 702 and the second device 710. The payment function 730 causes the second server of the second domain 706 to transmit the payment and payment identification 732 to the second entity 708.

Transmission of the payment and payment identification 732 to the second entity 708 causes (e.g., triggers or includes) transmission of a notification of receipt 734 to the data management system 100. The notification of receipt includes the unique identifier, as well as a payment identifier generated in function 732. In various embodiments, the payment identifier is presented within transaction records of the second entity 708. The payment identifier may be one or more of, but not limited to, ACH descriptors, generated check numbers, or previously supplied data movement request or unique identifier. In response to receiving the notification of receipt 734, the data management system 100 causes presentation of a notification of receipt 736 at the second device 710. Matching the notification of receipt 736 to the unique identifier for the transaction, the data management system 100 verifies via function 738 (e.g., reconciles) the account information matching with payment identifier received in an electronic statement download from second entity as show in function 740.

The unique identifier and the payment identifier may be generated as numeric strings, alpha-numeric strings, or any suitable uniquely identifiable code. In some embodiments, one or more of the unique identifier and the payment identifier are generated as alpha-numeric strings of at least sixteen characters. In some instances, one or more of the unique identifier and the payment identifier are sequential, building on previous identifiers while maintaining a unique string. In some instances, a portion of an identifier indicates the second server of the second domain 706 and correlates the data movement request with the second server of the second domain 706. For example, three digits of the identifier may be contain a dedicated code for the second server of the second domain 706.

Figure 8:
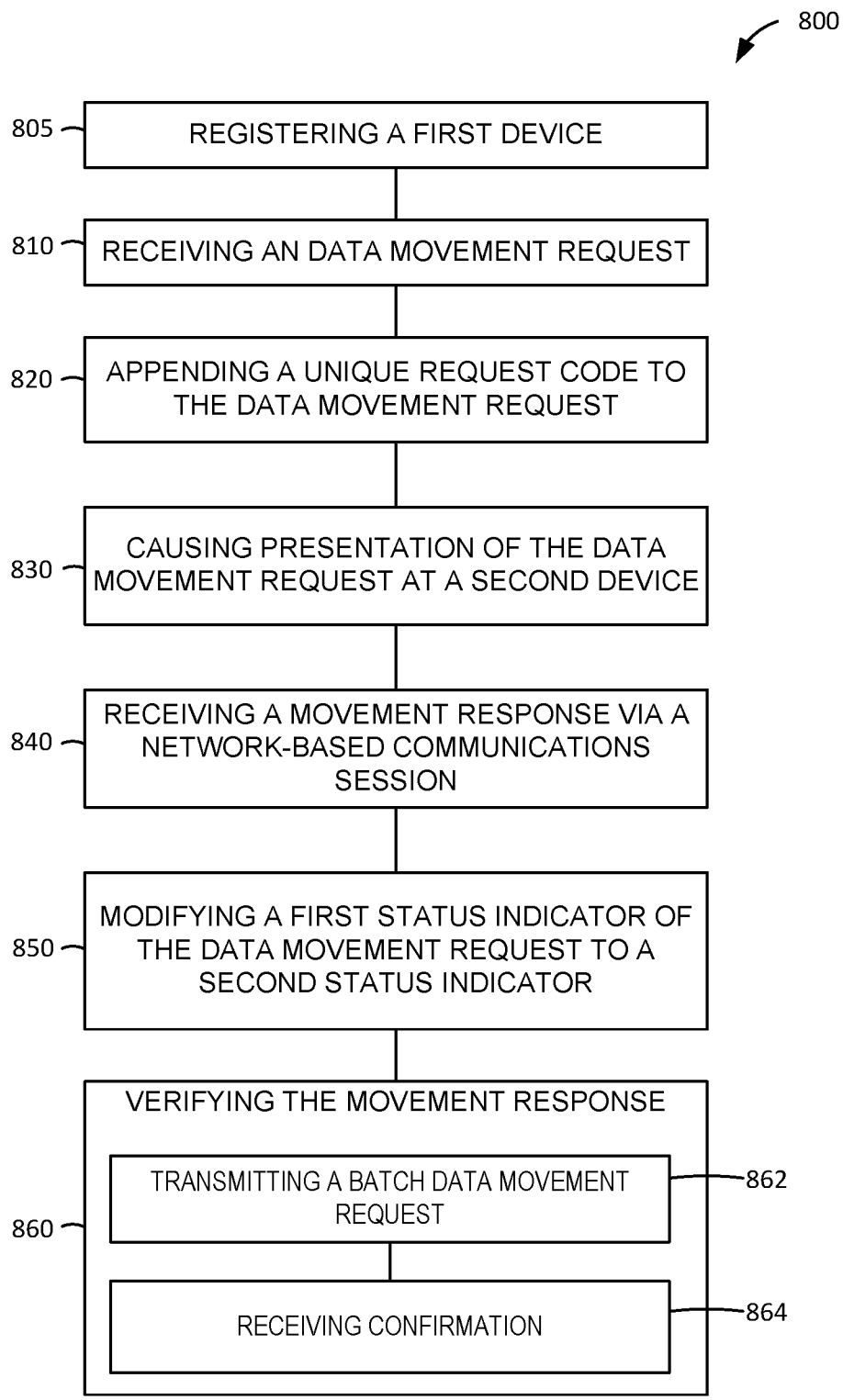
FIG. 8 is a flowchart of an example method for facilitating data movement and reconciliation, according to some embodiments.

FIG. 8 is a flowchart of an example method 800 for facilitating data movement request presentment, data movement, and reconciliation services. Operations in the method 800 may be performed by the data management system 100 using modules and components described above with respect to FIG. 5 and hardware described below with respect to FIG. 10.

In various embodiments, the method 800 may be initiated with an operation 805. In operation 805, the login module 142 in cooperation with one or more of the verification module 550, the presentation module 570, and the communication module 580 causes presentation of one or more user interface elements enabling a user of a client device (e.g., the client device 480, the first device 702, the second device 710) to input information and register with one or more of the data management system 100, the first entity 704, and the second server of the second domain 706. The information input into the one or more user interface elements may include demographic information, identification information, or second entity information associated with the user. The login module 142 and one or more of the verification module 550, the presentation module 570, and the communication module 580 performs the operation 805 to register a second user (e.g., second user or the second device 710) and the first user's profile on the data management system 100 with a first entity (e.g., first entity 704) and a second server of a second domain (e.g., payment service 706). The registration process enables the data management system 100 to track and reconcile data movement requests received at the data management system 100 for presentation to the first entity (e.g., first entity) and receive the movement response of the data movement request from one or more of the first entity, the second entity, or the second server of the second domain.

In some embodiments, the operation 805 is performed in a graphical user interface of the data management system 100 after the second device 710 transmitted one or more login credentials to the data management system 100. After registering with one or more of the first entity 704 and the second entity 708, the data management system 100 may automatically download transaction records from the second entity 708 into the user profile of the data management system 100 and receive transaction notifications from the first entity 704. In some instances, the data management system 100 may download only indications of the transactions, such as an amount of each transaction, a date of each transaction, and an identifier for each transaction. The data management system 100 may automatically reconcile previous data movement requests with one or more of the transaction records or present the transaction records for manual reconciliation for past data movement requests.

In operation 810, the receiver module 510 receives a data movement request. The data movement request has a first status indicator representative of a status of the data movement request of the data movement request. The first status indicator represents an unfulfilled status of the data movement request (e.g., an unpaid payment status) of the data movement request. The receiver module 510 may receive the data movement request from the second device 710 of the second user. The receiver module 510 may receive an indication of the second user selecting to generate the data movement request via interaction with the second device 710. In these instances, the receiver module 510 may pass the request to generate the data movement request to one or more modules of the data management system 100 or the second device 710 to generate the data movement request. Where the second device 710 generates the data movement request, the second device 710 transmits the data movement request back to the data management system 100. Once the data movement request has been received by the receiver module 510, the data movement request is stored in the database 270 of the data management system 100. In some instances, the data movement request is associated with one or more profile of the first user and the second user, such that modifications of the data movement request or status of the data movement request may be reflected with one or more notifications presented at the second device 710 and the first device 702.

In various example embodiments, to create an data movement request, the second device 710 presents a user interface including selectable user interface elements configured to generate the data movement request with suitable information for processing by the data management system 100 and the data reconciliation system 505. For example, the second device 710 may present a create invoice button, operable (e.g., by the second user) to create an data movement request. Upon selection of the create data movement request button (e.g., invoice button), the second device 710 presents a series of user interface screens and user interface elements requesting information including a total amount for the data movement request, a name of the customer (e.g., the first user), a type of invoice, a logo for the business of the second user, an upload data entry field for uploading an image representative of the logo of the business, data entry fields for mailing addresses of each of the first user and the second user, billing information (e.g., a billing account number, a payable bank account, etc.), a metadata field for metadata regarding the data movement request, and item detail data. The metadata field may include fields for an invoice number, a reference name, a goods and services tax (GST) number, an issued date, and a due date. The item detail data may include an item description, a quantity, a unit price, and an amount.

In operation 820, the code management module 520 appends a unique request code to the data movement request. In various example embodiments, the code management module 520 generates the unique request code, in response to receiving the data movement request, prior to appending the unique request code to the data movement request. The code management module 520 may append the unique request code to a predetermined portion of instructions configured to represent the data movement request in a user interface. The code management may append the unique request code to the data movement request within metadata associated with the data movement request or within the instructions representative of the data movement request. In some embodiments, the instructions or the metadata may be exposed to an API of the data management system 100, enabling one or more of the metadata and the instructions to be opened and modified to include the unique request code. The unique request code may be presented to the user in a user perceivable format within a graphical representation of the data movement request.

In some example embodiments, the unique request code does not identify the specific data movement request. For example the unique request code may be an account identification for the second user of the data management system 100 or the second device 710 associated with the second user. In these embodiments, the data movement request may have a request identification number in addition to the unique request code. The data management system 100 may use the unique request code (e.g., the account identification) to track the progress of the data movement request and data provision (e.g., payment) of the data movement request within the first entity 704 and the second server of the second domain 706 and provide status modifications, notifications, and other data movement request tracking operations within the data management system 100 and to the second device 710. In this manner, requests, responses, and notifications among the first entity 704, the second server of the second domain 706, and the second entity 708, routed to the data management system 100 with the associated account identification (e.g., unique request code) may serve as an automated reconciliation system to generate account records within the data management system 100 to be associated with the accounts of the first user and the second user.

In operation 830, the presentation module 570 causes presentation of the data movement request at the first device 702 of the first user. In various embodiments, the data movement request is presented during a network based communication session with the second server of the second domain 706 or in a user session of the data management system 100. Where the data movement request is presented in the network based communication session, the data movement request may initially be presented at the first device 702 within a browser and without navigating away from the network based communication session. Where the data movement request is presented during a communication session of the data management system 100 and the first device 702, the data management system 100 may cause the first device 702 (e.g., the client device 480 shown in FIG. 6) to present the data movement request in a dedicated application, an email, an online user session, or any other suitable user session. Where presented as an email, a link contained in the email may, when selected as a user selectable element presented in a graphical user interface, automatically cause a web browser or application to open and prompt entry of user login credentials to view the data movement request. Once in the communication session, the data management system 100 may cause presentation of one or more of a data movement request identifier, a unique URL associated with the data movement request, and one or more detail information of the data movement request (e.g., currency amounts, services rendered, or goods purchased).

In some instances, the data movement request is presented in a communication outside the network based communication session. For example, the data movement request and unique request code may be presented at the first device 702 in the form of an email. In some embodiments, the unique request code may form a link to the second server of the second domain 706 or the first entity 704. Selecting the link within the email presented at the first device 702 may cause the first device 702 of the first user to be directed to transmit login credentials. For example, the link may cause the first device 702 to present directions for the first user to sign in for a network based communication session with the first entity 704 or the second server of the second domain 706. The first device 702 may transmit login credentials to the network based communication session to cause presentation of additional information related to the data movement request or make a payment for the data movement request.

In various embodiments, the data movement request includes a payment link. The payment link may include a link to the second server of the second domain 706. Upon selection of the payment link, the first device 702 present a user interface prompt for an identification of the first entity 704. Upon selection of the identification of the first entity 704 the browser of the first device 702 of the first user is directed to a second server of the second domain (e.g., the payment service 706) of a plurality of second servers. The second server of the plurality of second servers is a second server which supports the first entity 704. In addition to directing the browser of the client device to the selected second servers, selecting the first entity 704 may automatically populate payment information required by the selected second server 706 to perform a transaction in response to the data movement request. In various example embodiments, the data movement request prepopulates an identifier for one or more of the data movement request (e.g., the unique request code, the request identifier, the account identification) and the first user or first device 702; an amount of the invoice (e.g., a total amount of the invoice, a minimum payment, etc.); and identification of the second user or second device 710. The first device 702 may then receive selection of a payment button (e.g., a user interface element) to instruct the second server 706 to process the payment among the first entity 704 and the second entity 708.

In operation 840, the movement module 530 receives a movement response via the network based communication session. In some instances, the movement response includes payment transaction details indicative of a payment received from the client device by the second server 706. The movement response may be generated by one or more of the first entity 704 and the second server 706. Where generated by the first entity 704, the movement response is an indication that the payment has been forwarded to the second server 706. In these embodiments, the movement response is forwarded, along with payment instructions to the second server 706 for further processing of the movement response and the payment instructions. Where the movement response is generated by the second server 706, the movement response is generated in response to receiving payment instructions from the first entity 704.

The payment transaction may extend between two or more of the second entity 708, the first entity 704, and the second server 706. In some embodiments, when the payment transaction is processed between the first entity 704 and the second entity 708, the data management system 100 may receive a notice of the payment (e.g., the movement response) based on registration of one or more of the user and the data management system 100 with the first entity 704 or the second server 706. In some embodiments, when the first entity 704 transmits payment to the second entity 708, the transmission of payment causes a payment server of the first entity 704 to parse one or more notification tables to determine one or more entities to whom the movement response will be transmitted. In some instances, registration of the user with the first entity 704 through the data management system 100 causes the payment server to identify the data management system 100 as a recipient of the movement response. The registration of the user with the first entity 704 may be achieved through one or more of the functions 712 and 714. The movement response may be transmitted in response to the function 722, presenting the ebill to one or more of the second server 706 and the first entity 704.

In operation 850, the status module 540 modifies the first status indicator of the data movement request to a second status indicator to provisionally reflect the receipt of movement response. In some instances, after the data movement request (e.g., the notification of receipt 734) has been received and stored in the database 270, the data movement request may include one or more indicator bits. The indicator bits may be modified by the status module 540 to indicate the current status of the data movement request of the data movement request. Upon receiving notifications representing changes in the status of the data movement request, the status module 540 may change the indicator bit, generate a notification of the change in the status of the data movement request, and transmit the notification of the change in status of the data movement request to one or more of the first device 702 and the second device 710. As described in operation 850, the status module 540 may perform multiple modifications to the indicator bits based on transaction stages. In some instances, a modification, such as the change from the first status indicator to the second status indicator, may be understood as a provisional change reflecting an expectation of a further modification of the status indicator. For example, the status module 540 may change the indicator bit to a value indicating an data movement request has been partially paid (e.g., a provisional change) or paid (e.g., the further modification of the status indicator.).

In operation 860, the verification module 550 verifies the movement response from a payment receipt. Verifying the movement response may be understood as reconciling a banking record with the data movement request. In various example embodiments, the operation 860 contains one or more further operations. For example, as shown in FIG. 8, in operation 862, the verification module 550 transmits a batch data movement request to one or more of the second entity 708 (e.g., a bank associated with a recipient of the payment, the second server 706) and the primary data center 410. The batch data movement request may be transmitted to the second entity 708, the second server 706, or the primary data center 410 via the communication module 580 and the network 455. For example, in some embodiments, the batch data movement request may be transmitted to the primary data center 410 for processing and routing to the second server 706 or the second entity 708. In some instances, the primary data center will determine payment reconciliation prior to responding to the verification module 550.

In operation 864, the verification module 550 receives confirmation of the data movement from one or more entity. In some embodiments, the data movement may be a payment for which confirmation is received and the one or more entity may be a financial institution. For example, the verification module 550 may receive confirmation from the first entity 704, the second entity 708, the second server 706, or the primary data center 410. The confirmation may be in the form of a statement of data movement (e.g., a set of transactions falling within a specified date), a payment query response, or any other suitable confirmation. Where the verification module 550 receives confirmation from the first entity 704, the first entity 704 may transmit an indication that funds have been deducted from the first user account. Where the verification module 550 receives confirmation from the second entity 708, the second entity 708 may transmit an indication that funds have been received into the second user account. Where the verification module 550 receives confirmation from one or both of the second server 706 or the primary data center 410, the second server 706 may indicate a completion of processing the payment through the second server 706. The primary data center 410 may provide confirmation that one or more of the second entity 708, the first entity 704, and the second server 706 has performed the above described actions.

In some embodiments, in operation 864, the receiver module 510 receives a bank statement from the second entity 708 as confirmation of the payment form one or more financial institution. The receiver module 510 may receive the bank statement in response to the batch data movement request. The bank statement is a statement of data movement for the second user and may include one or more of payee account information, payer account information, the payment identifier, the unique transaction identifier, and other transaction details. In some instances, the payment identifier may be stored in an ACH field. In various embodiments, the bank statement is a statement response in the form of an XML document or other structured data format.

The receiver module 510 may pass the bank statement to the verification module 550. In response to receiving the bank statement and without user interaction, the verification module 550 matches the bank statement to the data movement request. In some instances, the verification module 550 reconciles the account information with the bank statement by matching the payment identifier received in the electronic bank statement with the unique identifier for the data movement request. The verification module 550 may identify the payment identifier within the bank statement stored in the ACH field, parse the payment identifier, and parse one or more unique identifiers included within data movement requests associated with a payee in the data management system 100. The verification module 550 may match the payment identifier with one of the one or more unique identifiers by determining the values for a unique identifier and the payment identifier are identical.

In embodiments where the verification module 550 receives confirmation from the second server 706 and the bank statement from the second entity 708. The verification module 550 matches the data movement request to the bank statement and the confirmation from the second server 706 to reconcile the account information with the bank statement and the confirmation from the second server 706. In some instances, the verification module 550 automatically parses the bank statement and the confirmation from the second server 706 and compares information parsed from the bank statement and the confirmation with the data movement request to match the payment identifier in the electronic bank statement and the payment identifier in the confirmation with the unique identifier for the data movement request.

Figure 9:
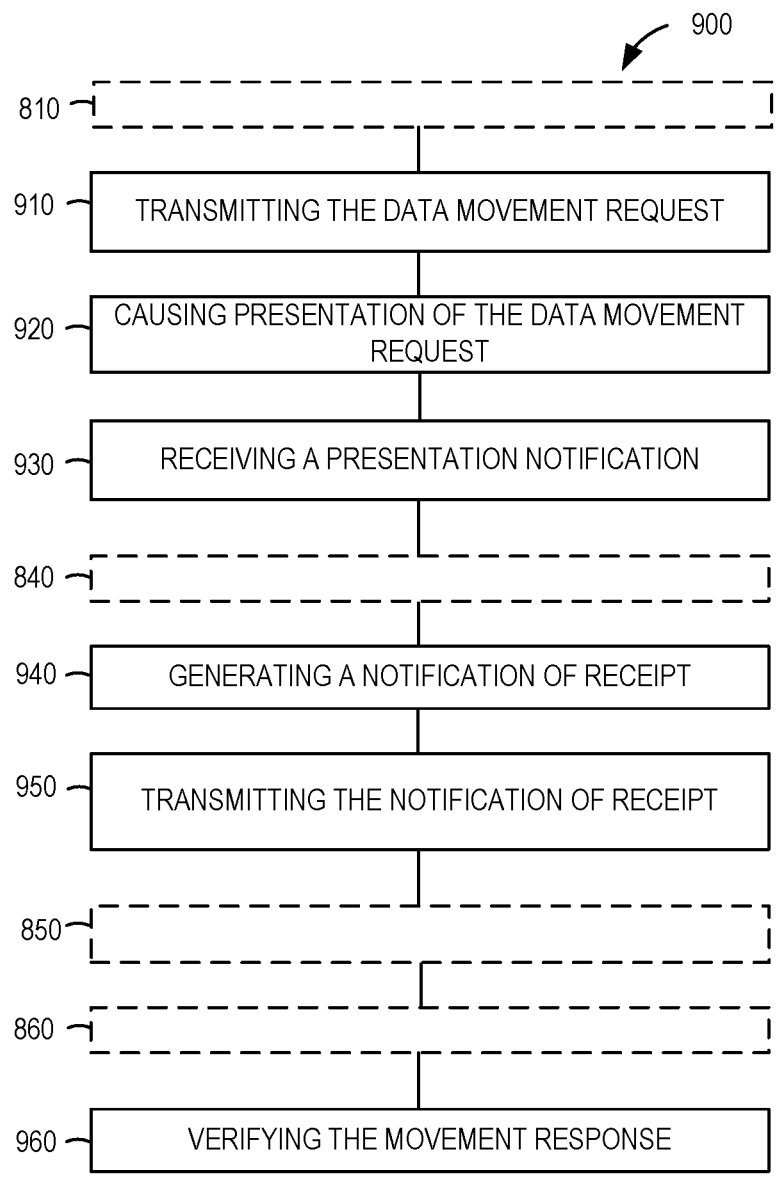
FIG. 9 is a flowchart of an example method for facilitating data movement request processing and reconciliation, according to some embodiments.

FIG. 9 is a flowchart of an example method 900 for facilitating data movement request processing and payment reconciliation. Operations of the method 900 may be performed by the data management system 100 using modules and components described above with respect to FIG. 5 and hardware described below with respect to FIG. 10. As shown in FIG. 9, the method 900 includes one or more operations of the method 800 described above.

In some instances, the method 900 is initially performed by operation 810. In various example embodiments, the data movement request includes a detail link. The detail link may be understood and implemented as a hyperlink, a network address, or any other suitable link enabling communication or contact with the second server. In order to initiate the communication relating to the detail link, the first device 702 receives a selection of the detail link in a user interface representation of the data movement request. The detail link is configured to direct a browser of the client device to request transaction detail information from the server via the network, the transaction detail information including transaction information for the data movement request.

In operation 910, the movement module 530 transmits the data movement request (e.g., the data movement request for the payer), including the unique data movement request code and the detail link, to the second server 706 for presentation during the network based communication session. The movement module 530 may transmit the data movement request, the unique request code, and the detail link using the communication module 580 via the network 455.

In various example embodiments, the transmission of the data movement request, unique request code, and the detail link is in response to receiving a request for ebill or data movement request information from the first device 702, via the first entity 704, to one or more of the second server 706 and the data management system 100. For example, the request for ebill is received by the second server 706 and transmitted to the data management system 100 storing the data movement request, unique request code, and detail link. In return, the data management system 100 transmits the ebill (e.g., the data movement request, the unique request code, and the detail link) to the second server 706 for presentation at the first device 702.

In operation 920, in response to receiving a request for transaction detail, the presentation module 570 causes presentation of the data movement request, the unique request code, and further transaction detail information at the first device 702 associated with the first user. The request for transaction detail may be in the form of the first device 702 receiving a selection of the detail link within the data movement request in the network based communication session and generating an indication of the selection as the request for transaction detail. Selection of the detail link may cause the client device to transmit a request to the second server 706 for forwarding to the data management system 100. In response to the request, the transaction detail information may be transmitted to the second server 706 from the data management system 100. The transaction detail may include the data movement request, time of data movement request, itemized charges, goods or services received, and other pertinent information stored on the data management system 100. In various example embodiments, causing presentation of the transaction detail information is performed by providing the transaction detail information as presented during the network based communication session without navigating away from or interrupting the network based communication session. In some instances, the detail link may navigate or otherwise direct the client device browser to, or open a new window directed to, the data management system 100 for presentation of the transaction detail.

In operation 930, the movement module 530 receives a presentation notification from the second server 706. The presentation notification is indicative of presentation of at least the data movement request and unique request code at the client device during the network based communication session. The presentation notification may be automated such that when the data movement request is presented at the first device 702 on the client device, the client device transmits a response through the second server 706 to the data management system 100 indicative of the presentation. The presentation notification may be in the form of user interface instructions configured to generate a user perceivable notification, instructions configured to change a status or other portion of the data movement request on the database 270 of the data management system 100, or any other suitable presentation notification. In some instances, the presentation notification may be forwarded to the second device 710 or otherwise indicated in a profile of the second user.

In various example embodiments, after receiving the movement response in operation 840, the movement module 530, in operation 940, generates a notification of receipt, the notification containing confirmation of receipt of the movement response from the second server 706. In some embodiments, where the movement response is an indication of payment, the notification may be a notification of payment received from a payment service in the form of the second server 706. The notification of receipt may be generated in response to the first device 702 interacting with the first entity 704 in the network based communication session to set up a payment for the data movement request.

In some instances, the first entity 704 may generate a payment instruction, after interaction with the first device 702. The first entity 704 may then transmit the payment instruction to the second server 706. After receiving the payment instruction, the second server 706 may execute the payment instruction against the first user's account at the first entity 704 and transmit the funds, along with a payment identification to the second entity 708. The second server 706 may also include the payment identification and the unique request code in the movement response transmitted to the data management system 100. The data management system 100 may store the movement response in the database 270 and associate the movement response with the data movement request.

In operation 950, the movement module 530 transmits the notification of receipt, including the payment identification and the unique request code, to the second device 710 of the second user via the network 455. In some instances, the movement module 530 may also transmit the notification of receipt to the first device 702 of the first user as a confirmation of the payment transaction.

In some embodiments, at least a portion of the method 900 may be further performed in the operation 850, by modifying the first status indicator, and the operation 860, by verifying the movement response. In operation 960, in response to verifying the movement response, the status module 540 modifies the second status indicator to a third status indicator to reflect the verification of the movement response for the data movement request. The status module 540 may modify the data movement request within the database 270 and information relating to the data movement request in one or more of the profiles of the first user and the second user. In these embodiments, the first device 702 and the second device 710 may receive a final notification of the status of the data movement request and the status module 540 may close a transaction represented by the data movement request.

Certain embodiments are described herein as including logic or a number of components, modules, or mechanisms. Modules may constitute either software modules (e.g., processor executable instructions embodied on a non-transitory machine-readable storage medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
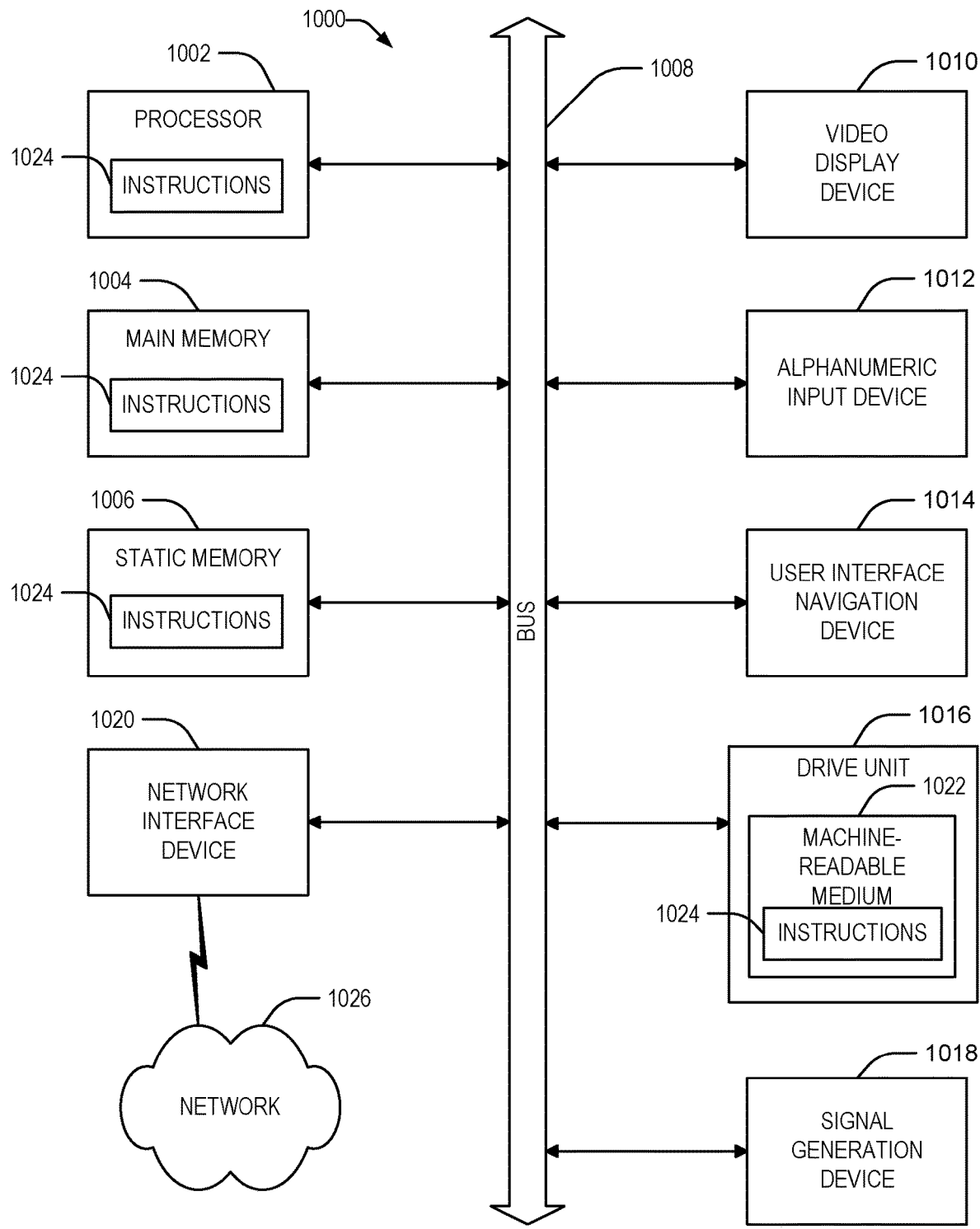
FIG. 10 is a block diagram of a machine in the example form of a computer system within which a set of instructions, for causing the machine to perform any one or more of the methodologies discussed herein, may be executed, according to some embodiments.

FIG. 10 is a block diagram of a machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1000 includes a processor 1002 (e.g., a central processing unit (CPU), a graphics processing unit (GPU), or both), a main memory 1004, and a static memory 1006, which communicate with each other via a bus 1008. Computer system 1000 may further include a video display device 1010 (e.g., a liquid crystal display (LCD) or a cathode ray tube (CRT)). Computer system 1000 also includes an alphanumeric input device 1012 (e.g., a keyboard), a user interface navigation device 1014 (e.g., a mouse or touch sensitive display), a disk drive unit 1016, a signal generation device 1018 (e.g., a speaker), and a network interface device 1020.

Disk drive unit 1016 includes a machine-readable medium 1022 on which is stored one or more sets of instructions and data structures (e.g., software) 1024 embodying or utilized by any one or more of the methodologies or functions described herein. Instructions 1024 may also reside, completely or at least partially, within main memory 1004, within static memory 1006, and/or within processor 1002 during execution thereof by computer system 1000, with main memory 1004 and processor 1002 also constituting machine-readable media.

While machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 1024 may further be transmitted or received over a communications network 1026 using a transmission medium. Instructions 1024 may be transmitted using network interface device 1020 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
receiving, at an accounting platform server and via a network, a user request in a user interface of a first user, the user request being for a transfer from the first user to a second user, the user interface being provided by the accounting platform server, the accounting platform server providing accounting services and maintaining bookkeeping accounts for a plurality of contacts including the first user, the first user being associated with a first entity server and the second user being associated with a second entity server;
generating a data transfer request based on the user request, the data transfer request including a request identifier that uniquely identifies the data transfer request from other data transfer requests;
sending the data transfer request via the network, from the accounting platform server to the first entity server, the data transfer request being to make the transfer from the first entity server to the second entity server based on the request identifier;
receiving, by the accounting platform server, a notification of a completion of the data transfer request; and
providing, by the accounting platform server, a notification, in the user interface of the first user, indicative of reconciling, in a bookkeeping account of the first user maintained by the accounting platform server, that the data transfer request was completed.

2. The method as recited in claim 1, further comprising:
receiving, at the accounting platform server, login credentials of the first user to log into the first entity server.

3. The method as recited in claim 1, further comprising:
reconciling, at the accounting platform server, the completion of the data transfer request in the bookkeeping account of the first user for accounting services.

4. The method as recited in claim 1, further comprising:
transferring, from an account of the second user in the second entity server to an account of the first user in the first entity server, a payment based on the request identifier.

5. The method as recited in claim 1, wherein the user interface includes an option to make a payment on an invoice in the accounting platform server, wherein the user request is for making the payment of a selected invoice to the second user.

6. The method as recited in claim 1, wherein the user interface is provided by the accounting platform server.

7. The method as recited in claim 1, further comprising:
sending an email to the first user with an option to request the transfer, the email including a link to cause a web browser to open and prompt entry of user login credentials to view the request to transfer.

8. The method as recited in claim 1, further comprising:
receiving a multi-transfer request in the user interface of the first user, the multi-transfer request being for processing multiple transfer requests; and
sending multiple transfer requests to the first entity server based on the multi-transfer request.

9. The method as recited in claim 1, wherein the user interface presents invoices to be paid, wherein the first user selects one of the invoices to be paid to generate the user request for transfer.

10. The method as recited in claim 9, wherein the accounting platform server accesses banking data of clients associated with the presented invoices.

11. An accounting platform server comprising:
a memory comprising instructions; and
one or more computer processors, wherein the instructions, when executed by the one or more computer processors, cause the one or more computer processors to perform operations comprising:
providing a user interface to a first user, the first user being one of a plurality of contacts for which the accounting platform server provides accounting services and maintains bookkeeping accounts;
receiving, via a network, a user request in the user interface of the first user, the user request being for a transfer from the first user to a second user, the first user being associated with a first entity server and the second user being associated with a second entity server;
generating a data transfer request based on the user request, the data transfer request including a request identifier that uniquely identifies the data transfer request from other data transfer requests;
sending the data transfer request, via the network, to the first entity server, the data transfer request being to make the transfer from the first entity server to the second entity server based on the request identifier;
receiving a notification of a completion of the data transfer request; and
providing a notification, in the user interface of the first user, indicative of reconciling, in a bookkeeping account of the first user maintained by the accounting platform server, that the data transfer request was completed.

12. The accounting platform server as recited in claim 11, wherein the instructions further cause the one or more computer processors to perform operations comprising:
receiving login credentials of the first user to login into the first entity server.

13. The accounting platform server as recited in claim 11, wherein the instructions further cause the one or more computer processors to perform operations comprising:
reconciling the completion of the data transfer request in the bookkeeping account of the first user for accounting services.

14. The accounting platform server as recited in claim 11, wherein the instructions further cause the one or more computer processors to perform operations comprising:
transferring, from an account of the second user in the second entity server to an account of the first user in the first entity server, a payment based on the request identifier.

15. The accounting platform server as recited in claim 11, wherein the instructions further cause the one or more computer processors to perform operations comprising:
receiving a multi-transfer request in the user interface of the first user, the multi-transfer request being for processing multiple transfer requests; and
sending multiple transfer requests to the first entity server based on the multi-transfer request.

16. A non-transitory machine-readable storage medium including instructions that, when executed by a machine, cause the machine to perform operations comprising:

receiving, at an accounting platform server and via a network, a user request in a user interface of a first user, the user request being for a transfer from the first user to a second user, the user interface being provided by the accounting platform server, the accounting platform server providing accounting services and maintaining bookkeeping accounts for a plurality of contacts including the first user, the first user being associated with a first entity server and the second user being associated with a second entity server;

generating a data transfer request based on the user request, the data transfer request including a request identifier that uniquely identifies the data transfer request from other data transfer requests;

sending the data transfer request via the network, from the accounting platform server to the first entity server, the data transfer request being to make the transfer from the first entity server to the second entity server based on the request identifier;

receiving, by the accounting platform server, a notification of a completion of the data transfer request; and providing, by the accounting platform server, a notification, in the user interface of the first user, indicative of reconciling, in a bookkeeping account of the first user maintained by the accounting platform server, that the data transfer request was completed.

17. The non-transitory machine-readable storage medium as recited in claim 16, wherein the machine further performs operations comprising:

receiving login credentials of the first user to login into the first entity server.

18. The non-transitory machine-readable storage medium as recited in claim 16, wherein the machine further performs operations comprising:

reconciling the completion of the data transfer request in the bookkeeping account of the first user for accounting services.

19. The non-transitory machine-readable storage medium as recited in claim 16, wherein the machine further performs operations comprising:

transferring, from an account of the second user in the second entity server to an account of the first user in the first entity server, a payment based on the request identifier.

20. The non-transitory machine-readable storage medium as recited in claim 16, wherein the machine further performs operations comprising:

receiving a multi-transfer request in the user interface of the first user, the multi-transfer request being for procession multiple transfer requests; and sending multiple transfer requests to the first entity server based on the multi-transfer request.

21. The method of claim 1, wherein the notification, in the user interface of the first user, is for performing reconciliation in the bookkeeping account of the first user.

22. The method of claim 1, wherein the notification, in the user interface of the first user, is indicative that the bookkeeping account has been reconciled.

23. The accounting platform server of claim 11, wherein the notification, in the user interface of the first user, is for performing reconciliation in the bookkeeping account of the first user.

24. The accounting platform server of claim 11, wherein the notification, in the user interface of the first user, indicative that the bookkeeping account has been reconciled.

25. The non-transitory machine-readable storage medium of claim 16, wherein the notification, in the user interface of the first user, is for performing reconciliation in the bookkeeping account of the first user.

26. The non-transitory machine-readable storage medium of claim 16, wherein the notification, in the user interface of the first user, indicative that the bookkeeping account has been reconciled.

* * * * *

UNITED STATES PATENT AND TRADEMARK OFFICE
CERTIFICATE OF CORRECTION

| | |
|---|---|
| PATENT NO. | : 11,399,062 B2 |
| APPLICATION NO. | : 16/055926 |
| DATED | : July 26, 2022 |
| INVENTOR(S) | : Katyal et al. |

It is certified that error appears in the above-identified patent and that said Letters Patent is hereby corrected as shown below:

On the Title Page

On page 2, in Column 1, under "U.S. Patent Documents", Line 13, delete "2011/0018491" and insert --2011/0184910-- therefor On page 2, in Column 1, under "U.S. Patent Documents", Line 21, delete "2013/0021201" and insert --2013/0212010-- therefor Signed and Sealed this
Twenty-fifth Day of April, 2023

Katherine Kelly Vidal
*Director of the United States Patent and Trademark Office*